(12) United States Patent
Clemen

(10) Patent No.: US 10,330,204 B2
(45) Date of Patent: Jun. 25, 2019

(54) BURNER SEAL OF A GAS TURBINE AND METHOD FOR MANUFACTURING THE SAME

(71) Applicant: Rolls-Royce Deutschland Ltd & Co KG, Blankenfelde-Mahlow (DE)

(72) Inventor: Carsten Clemen, Mittenwalde (DE)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 0 days.

(21) Appl. No.: 15/809,155

(22) Filed: Nov. 10, 2017

(65) Prior Publication Data
US 2019/0145524 A1 May 16, 2019

(51) Int. Cl.
| | |
|---|---|
| F16J 15/16 | (2006.01) |
| F16J 15/447 | (2006.01) |
| F02C 7/28 | (2006.01) |
| F02C 7/18 | (2006.01) |

(52) U.S. Cl.
CPC ............. *F16J 15/4472* (2013.01); *F02C 7/18* (2013.01); *F02C 7/28* (2013.01)

(58) Field of Classification Search
CPC ........ F16J 15/164; F16J 15/4472; F02C 7/18; F02C 7/28
See application file for complete search history.

(56) References Cited

U.S. PATENT DOCUMENTS

| | | | |
|---|---|---|---|
| 3,385,055 A | 5/1968 | Koblish | |
| 4,365,470 A | 12/1982 | Matthews et al. | |
| 4,689,961 A | 9/1987 | Stratton | |
| 4,934,145 A | 6/1990 | Zeisser | |
| 5,253,471 A * | 10/1993 | Richardson | F23R 3/10 60/754 |
| 5,357,745 A * | 10/1994 | Probert | F23R 3/10 60/39.37 |
| 5,765,376 A * | 6/1998 | Zarzalis | F23R 3/10 60/748 |
| 5,894,732 A | 4/1999 | Kwan | |

(Continued)

FOREIGN PATENT DOCUMENTS

| | | |
|---|---|---|
| DE | 1601678 A1 | 8/1970 |
| DE | 3113381 A1 | 4/1982 |

(Continued)

OTHER PUBLICATIONS

European Search Report dated Apr. 5, 2018 for counterpart European Patent Application No. 17201073.8.

(Continued)

*Primary Examiner* — Gilbert Y Lee
(74) *Attorney, Agent, or Firm* — Shuttleworth & Ingersoll, PLC; Timothy Klima

(57) ABSTRACT

A burner seal of a gas turbine with a substantially tubular base body, which has a ring-shaped inlet lip on the inflow side and a funnel at its outflow side, wherein an inner diameter of the inflow side is embodied to be larger than an inner diameter of a sealing surface that is arranged axially in front of the funnel, wherein cooling channels are formed in the base body distributed about the circumference, wherein the cooling channels are formed respectively in the base body in the area of the sealing surface and of the funnel, and respectively open into an end area of the funnel in an exit hole.

13 Claims, 9 Drawing Sheets

(56) References Cited

U.S. PATENT DOCUMENTS

| | | | |
|---|---|---|---|
| 5,957,462 A * | 9/1999 | Nishiyama | F16J 15/164 |
| | | | 277/580 |
| 6,035,645 A | 3/2000 | Bensaadi et al. | |
| 6,286,302 B1 | 9/2001 | Farmer et al. | |
| 6,389,815 B1 | 5/2002 | Hura et al. | |
| 9,958,159 B2 * | 5/2018 | Smallwood | F23R 3/002 |
| 2008/0236169 A1 | 10/2008 | Hawie et al. | |
| 2013/0042627 A1 * | 2/2013 | Gerendas | F23R 3/10 |
| | | | 60/782 |
| 2013/0199194 A1 * | 8/2013 | Carlisle | F23R 3/002 |
| | | | 60/772 |
| 2014/0367494 A1 | 12/2014 | Donovan | |
| 2015/0059346 A1 | 3/2015 | Bunel et al. | |
| 2015/0135719 A1 * | 5/2015 | Gerendas | F23R 3/002 |
| | | | 60/752 |
| 2015/0260409 A1 | 9/2015 | Clemen et al. | |
| 2018/0171953 A1 * | 6/2018 | Wilson | F23R 3/50 |

FOREIGN PATENT DOCUMENTS

| | | |
|---|---|---|
| DE | 19508111 A1 | 9/1996 |
| DE | 69722877 T2 | 5/2004 |
| DE | 60011174 T2 | 7/2005 |

OTHER PUBLICATIONS

German Search Report dated Mar. 17, 2017 from counterpart German App No. 102016212649.0.

* cited by examiner

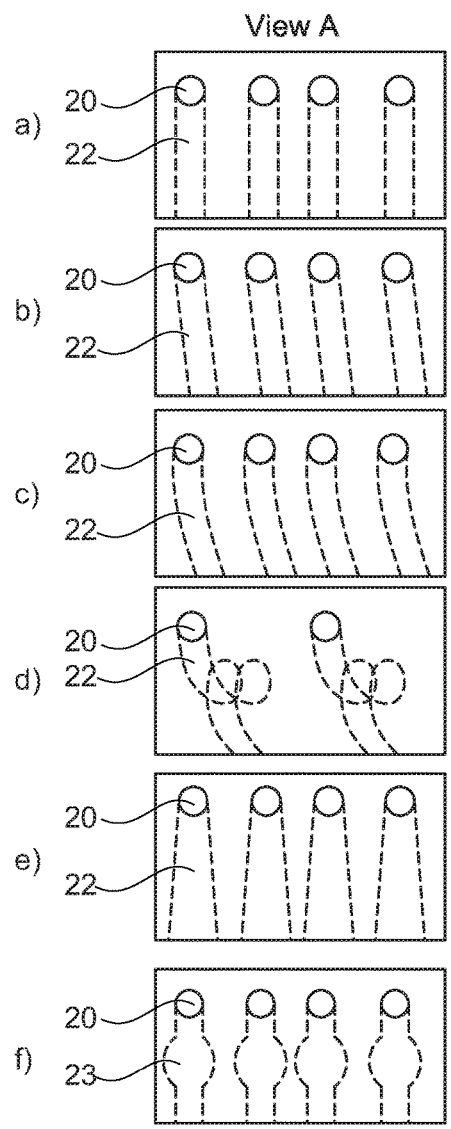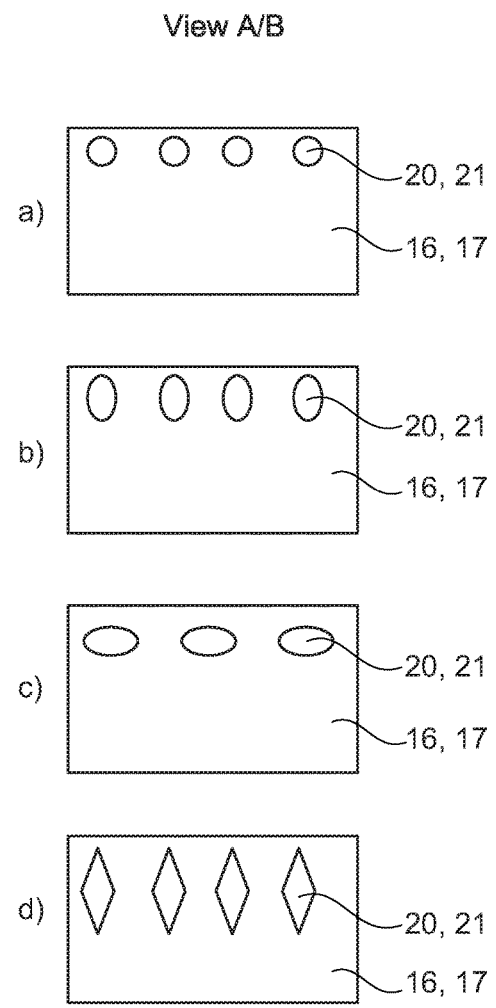
Fig. 5
Fig. 6

BURNER SEAL OF A GAS TURBINE AND METHOD FOR MANUFACTURING THE SAME

The invention relates to a burner seal of a gas turbine as well as to a method for manufacturing the same.

Specifically, the invention relates to a burner seal with a substantially tubular base body, which has a ring-shaped inlet lip on the inflow side and a funnel on its outflow side, wherein an inner diameter of the inflow side is embodied to be larger than an inner diameter of a sealing surface that is arranged axially in front of the funnel, wherein cooling channels are formed in the base body in a manner distributed about the circumference.

A burner seal of the above-mentioned kind is used to seal fuel nozzles of a combustion chamber of a gas turbine against a head plate and/or a heat shield of the combustion chamber. Here, particularly the funnel of the burner seal protrudes into the combustion space and is subjected to the high temperatures present therein. As a result, it is necessary to sufficiently cool the burner seal and in particular the funnel. When the cooling is not sufficient, there is the danger that the funnel including the funnel-shaped lip formed thereat burns off.

Figure 2:
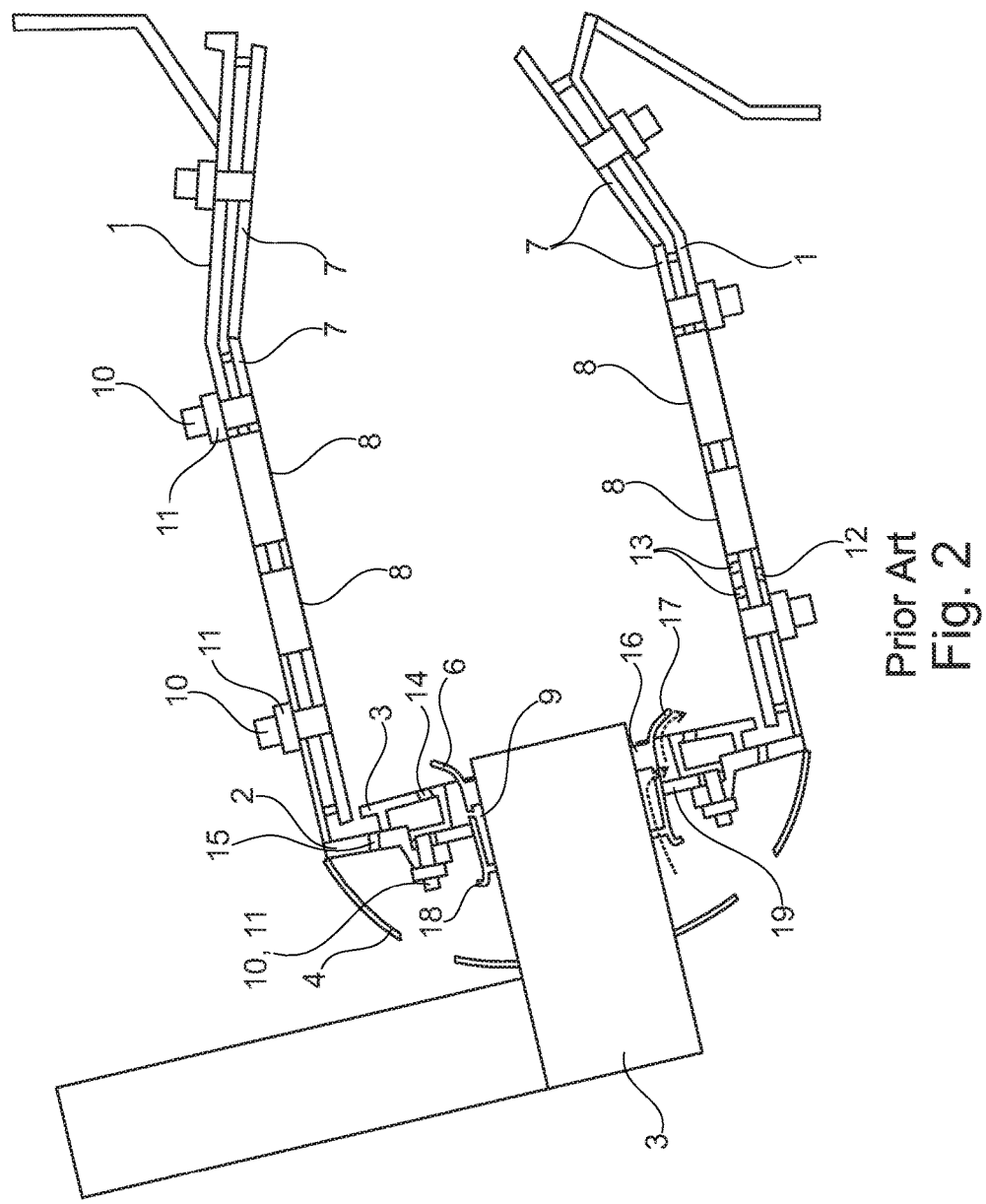
Figure 3:
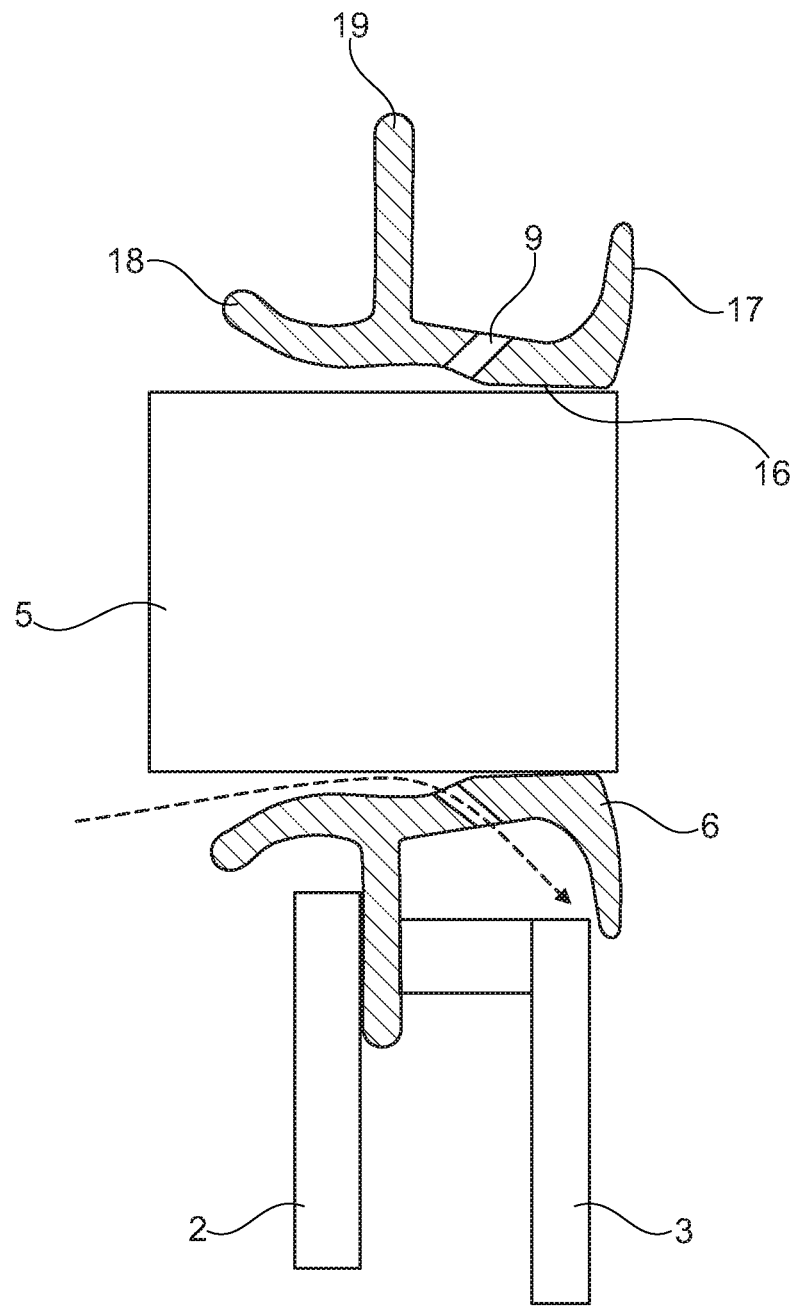

In the following, the state of the art that the invention is based on will be described by referring to FIGS. 2 and 3. Here, FIG. 2 shows a simplified axial sectional view of a gas turbine combustion chamber with a burner seal. FIG. 3 shows a schematic sectional view of the burner seal, which is analogous to FIG. 2.

The combustion chamber shown in FIG. 2 comprises a combustion chamber wall 1 with a head plate 2 that is protected against the combustion space by means of a heat shield 3. Shingles 7 are arranged in the internal space of the combustion chamber wall 1, being screwed onto the combustion chamber wall 1 by means of bolts 10 and nuts 11 and shielding the same against the combustion space.

The construction shown in FIG. 2 is an annular combustion chamber. It is to be understood that it has an outer and an inner combustion chamber wall, with respect to a radial direction based on an engine central axis. With view to simplicity, this is not explained in detail in FIG. 2.

Admixing holes 8 are provided in the combustion chamber wall 1, also penetrating the shingles 7 and serving for supplying mixed air. The combustion chamber wall is provided with impingement cooling holes 12, the shingles 7 have effusion cooling holes 13. All this is known from the state of the art, so that a detailed further description may be omitted.

Further, FIG. 2 shows that the heat shield 3 is provided with cooling holes 14 through which cooling air, which flows through the cooling air holes 15 of the head plate 2, is used for cooling the heat shield 3. As shown in FIG. 2, the heat shield 3 is mounted at the head plate 2 by means of bolts 10 and nuts 11.

The head plate 2 as well as the heat shield 3 have a recess in which a burner seal 6 is arranged. A fuel nozzle 5, which is only shown in a schematic manner, is inserted through the burner seal 6 from the outside. It is passed through a recess of the combustion chamber head 4 and positioned in the burner seal 6.

To mount and seal the fuel nozzle 5 in a suitable manner regarding the combustion chamber, the burner seal 6 is positioned in a floatingly mounted manner between the head plate 2 and the heat shield 3. This facilitates a movement of the fuel nozzle 5 relative to the combustion chamber, and has the purpose of placing the fuel nozzle 5 in such a manner that not leakage occurs between the fuel nozzle 5 and the head plate 2 of the heat shield 3. FIG. 2 indicates the flow path of the cooling air that flows from the internal space of the combustion chamber head 4 along the burner seal 6 in a simplified rendering by means of dashed lines.

FIG. 3 shows the structure of the burner seal 6 according to the state of the art in a simplified rendering. The burner seal 6 comprises an inlet lip 18 to which a diameter area with a larger inner diameter connects in the axial direction (with respect to a central axis of the fuel nozzle 5). What results in this manner are flow paths for introducing the cooling air flow that is shown by dashed lines in FIG. 3 and for discharging it through cooling holes 9. The cooling holes 9 are arranged in the axial direction in front of a sealing surface 16. The sealing surface 16 abuts the fuel nozzle 5 in a sealing manner. Connecting in the axial direction to the sealing surface 16 is a funnel 17 (funnel-shaped lip) that extends into the internal space of the combustion chamber, as shown in FIG. 2. Further, the burner seal 6 comprises an annular web 19 that serves for attaching and mounting the burner seal 6 at the head plate 2 or the heat shield 3.

The burner seal 6 is formed in an aerodynamically advantageous manner so as to point upstream to the combustion chamber head 4 to improve the inflow of the cooling air (see FIG. 3). Serving this purpose is the inlet lip 18, guiding the flow from the combustion chamber head 4 to the fuel nozzle 5 in an advantageous manner. The burner seal 6 also has a funnel-like shape (funnel 17), pointing downstream to the combustion space to allow the flow from the fuel nozzle to open up radially as far as possible. The funnel 17, which protrudes into the combustion space, has to be sufficiently cooled to avoid burning off. For this purpose, according to the state of the art, the cooling air is guided through the discrete cooling air holes 9. The cooling holes 9 serve for guiding the flow from the combustion chamber head 4 radially outward from the internal space of the burner seal 6 to its external side, and for providing a surrounding flow around the funnel 17 at its backside. In this manner, the funnel 17 is cooled by the cooling air at its backside, before the cooling air flows into the combustion space between the heat shield 3 and burner seal 6.

It has been proven to be disadvantageous that the funnel 17 of the burner seal 6 is cooled only at its backside that is facing away from the combustion space. In this manner, it cannot be ensured to a sufficient degree that the funnel 17, and thus the burner seal 6, is not overheated and wears off, for example by burning off. Thus, the burner seal 6 has to be replaced when it has worn out. This requires an extensive mounting effort, which is cost-intensive and time-consuming. A further disadvantage is that air which flows out of the burner seal 6 cannot be used for controlling emissions of the combustion chamber, because the air conduction is extremely unspecific and random.

The invention is based on the objective to create a burner seal of the above-mentioned kind, in which the disadvantages of the state of the art are avoided and an improved cooling as well as an improved air conduction is facilitated, while at the same time having a simple structure and being easy and cost-effective to manufacture. A further objective of the invention is to create a method for manufacturing an improved burner seal.

The objective is achieved by a combination of features as disclosed herein.

According to the invention it is thus provided that the cooling channels are respectively formed in the base body in the area of the sealing surface and of the funnel, and respectively exit from the funnel in an end area of the funnel in an exit hole.

Regarding the method, the objective is achieved by manufacturing the burner seal by means of an additive manufacturing method, for example by means of a laser deposition method (DLD), or a similar method.

The solution according to the invention has created the possibility of internally cooling in particular the area of the sealing surface and of the funnel of the burner seal as well as the substantially radially outwardly oriented area of the funnel up to the end area of the funnel. The cooling channels according to the invention, which can be realized by means of an additive method in a simple and cost-effective manner, serve this purpose. Such cooling channels cannot be manufactured by means of a conventional drilling method, as their course and geometry are very complex. Here, the cooling channels are embodied in such a manner that they are arranged—as seen in the flow direction with respect to the fuel nozzle—in the interior of the burner seal in the area of the sealing surface, projecting at the end area of the funnel. In this manner, cooling air flowing trough the cooling channels can flow out at the end area of the funnel and cool the entire funnel in an effective manner. Further, the air flow can be preferably designed in such a manner that the discharged air is introduced into the internal space of the combustion chamber for reducing emissions.

Particularly preferably, the exit hole opens into an outermost end area of the funnel. In this manner, it can be ensured that the cooling channel is guided through the entire funnel and exits substantially at the radially outwardly oriented tip of the funnel. Thus, burning off of the funnel tip during operation can be avoided in a simple and cost-effective manner. Since in this way the cooling channel completely extends through the funnel, the side of the funnel that is facing the combustion chamber in the flow direction as well as the side of the funnel that is facing away from the combustion chamber can be effectively cooled up to the tip of the funnel.

A further improved effective cooling can be obtained if a center line of the exit hole of the cooling channel at the end area of the funnel is positioned at an angle of 70 to 90° with respect to a center line of the funnel. Particularly preferably, the center line of the exit hole is positioned in a range of 70° to 80°, and more preferably is 75°. Exiting cooling air can be admixed to the main flow of the combustion chamber in an aerodynamically advantageous manner in particular with an inclination of the center line in the range of between 70 and 80°.

To optimize the air flow through the cooling channels, it is particularly advantageous if the cooling channel has respectively one entry hole that is arranged in an area of the larger inner diameter of the base body of the burner seal. It is particularly advantageous if the entry hole is positioned at an upstream side of the sealing area. In this manner, the cooling air can flow into the burner seal through the area with the larger inner diameter and can be introduced into the cooling channels in an optimal manner.

According to the invention, the cooling channel can be embodied in different ways. It can extend in a linear manner, at an angle to the central axis of the burner seal, or in a curved or helical manner. The cooling channel can also be comprised of multiple linear sections or different bent or curved sections. What thus follows according to the invention are the most diverse variants for ensuring an optimal cooling of the burner seal, in particular of the sealing areas and of the funnel.

Further, it can also be advantageous according to the invention if the cross section of the entry hole and/or of the exit hole is designed in such a manner that an optimized through-flow is realized. The holes can be embodied to be circular, elliptic, diamond-shaped or drop-shaped.

Further, it can be provided in an advantageous further development of the invention that the cooling channels are formed in a variable manner with respect to their cross-sectional shape between the entry hole and the exit hole, for example with an elliptic entry hole and a round exit hole. The cross-sectional course of the respective cooling channels can also be designed to be constant between the entry hole and the exit hole. However, it is also possible to widen the cooling channel in the direction of the exit hole, so that the entry hole forms the narrowest cross section, and the cooling channel acts as a diffusor. Alternatively, it is also possible to design the cooling channel in a nozzle-like manner and thus to design the exit hole with a smaller cross-sectional surface than the entry hole. The cross section of the cooling channel can also be formed in such a manner that the entry hole represents the smallest area with respect to its cross section, and the cooling channel widens in the cross section. At that, it can form a cavity and taper off again towards the exit hole.

The burner seal preferably has a number of cooling holes that lies between ten and forty. In a circular cross section, the narrowest hole diameter (entry hole or exit hole) is 0.5 mm to 1 mm and/or has a surface of 0.8 $mm^2$ to 3 $mm^2$, for example.

Through the measures according to the invention, the cooling of the burner seal is improved, resulting in low wear and low maintenance costs. In addition, the air conduction according to the invention results in improved emission control. In this manner, in particular soot emissions can be reduced.

By means of the manufacturing method according to the invention, the burner seal can be manufactured with very complex geometries of the cooling channel as well as their entry and exit holes. This is not possible with other manufacturing methods.

Figure 1:
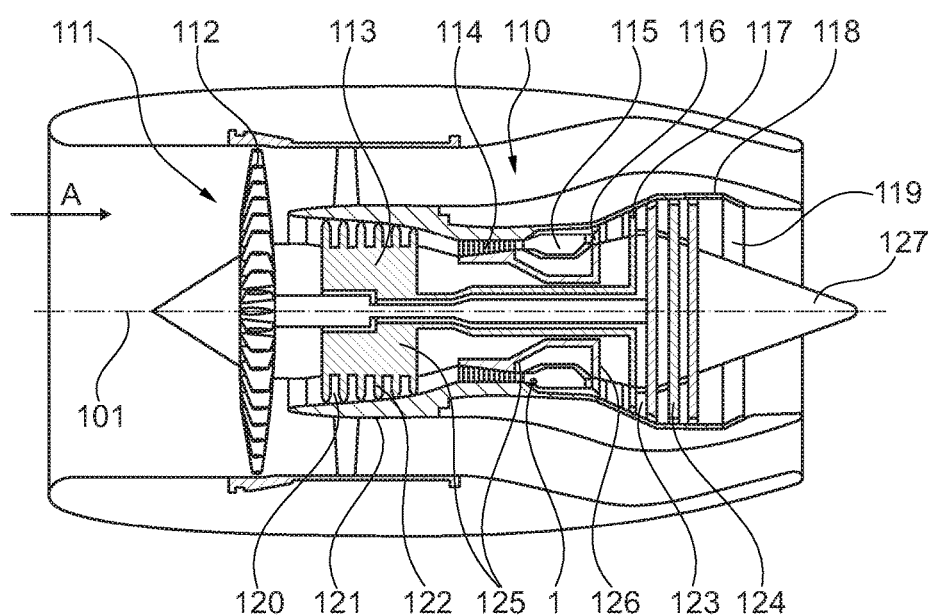
Figure 4:
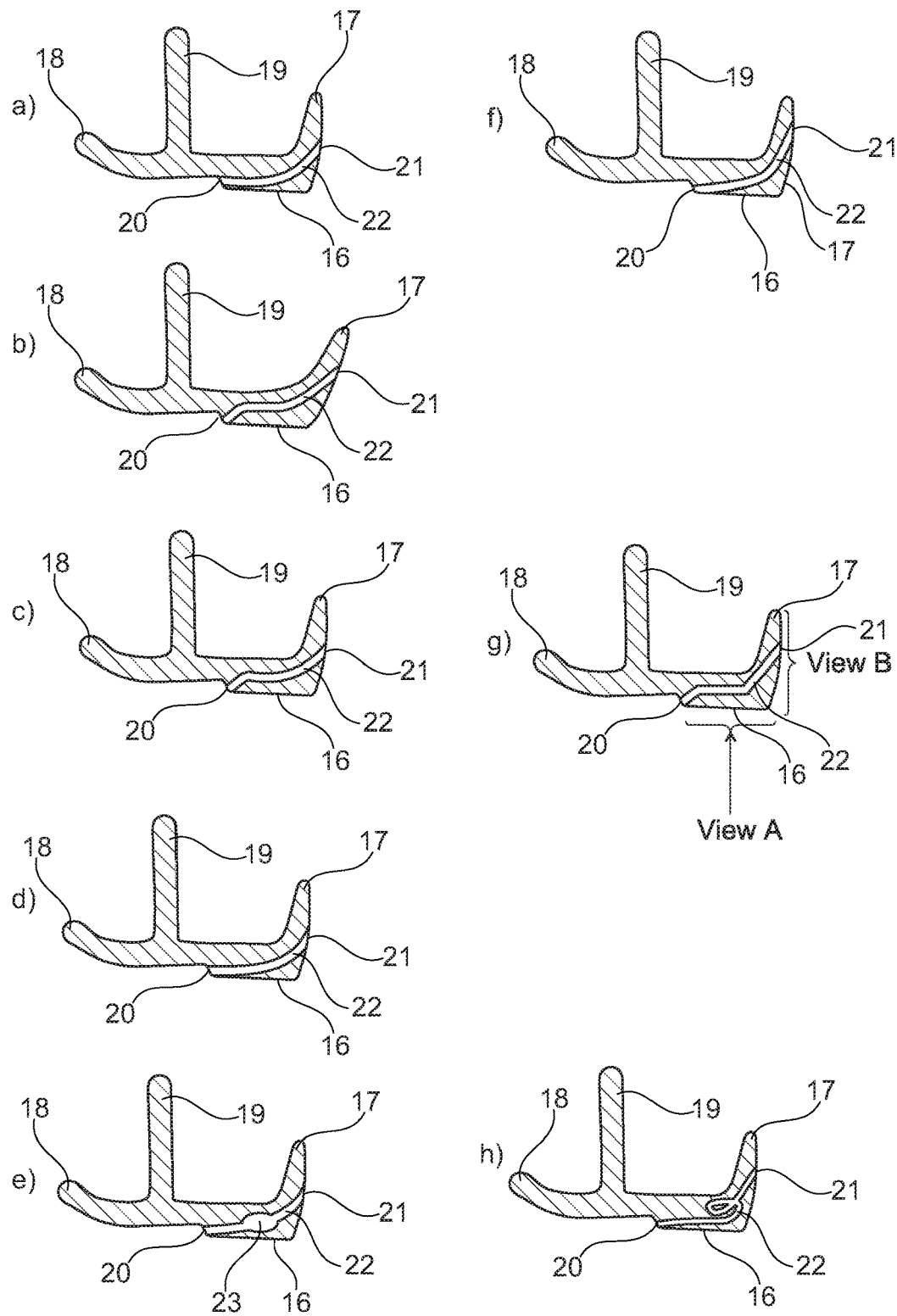
Figure 7:
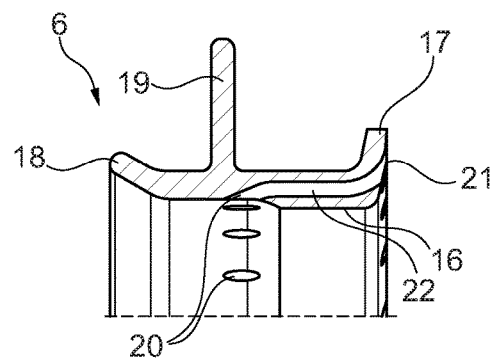
Figures 8, 9:
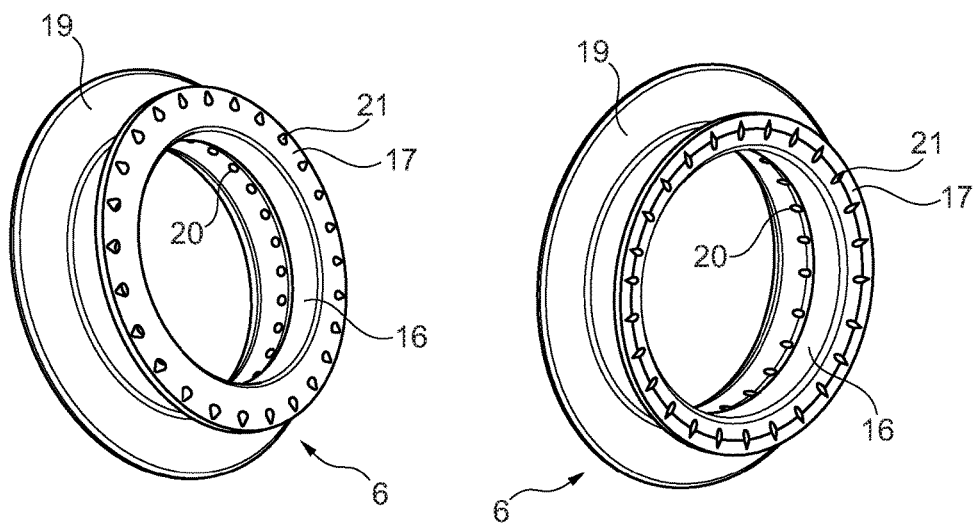
Figure 10:
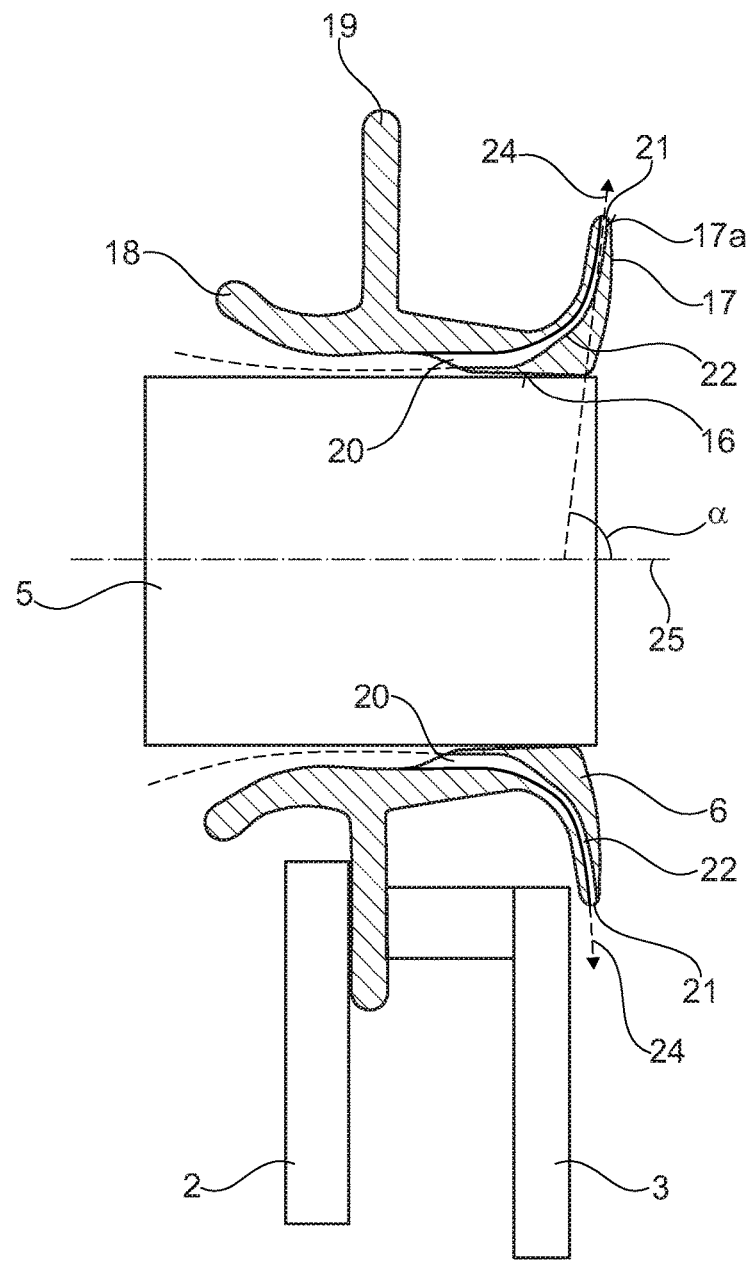
Figure 11:
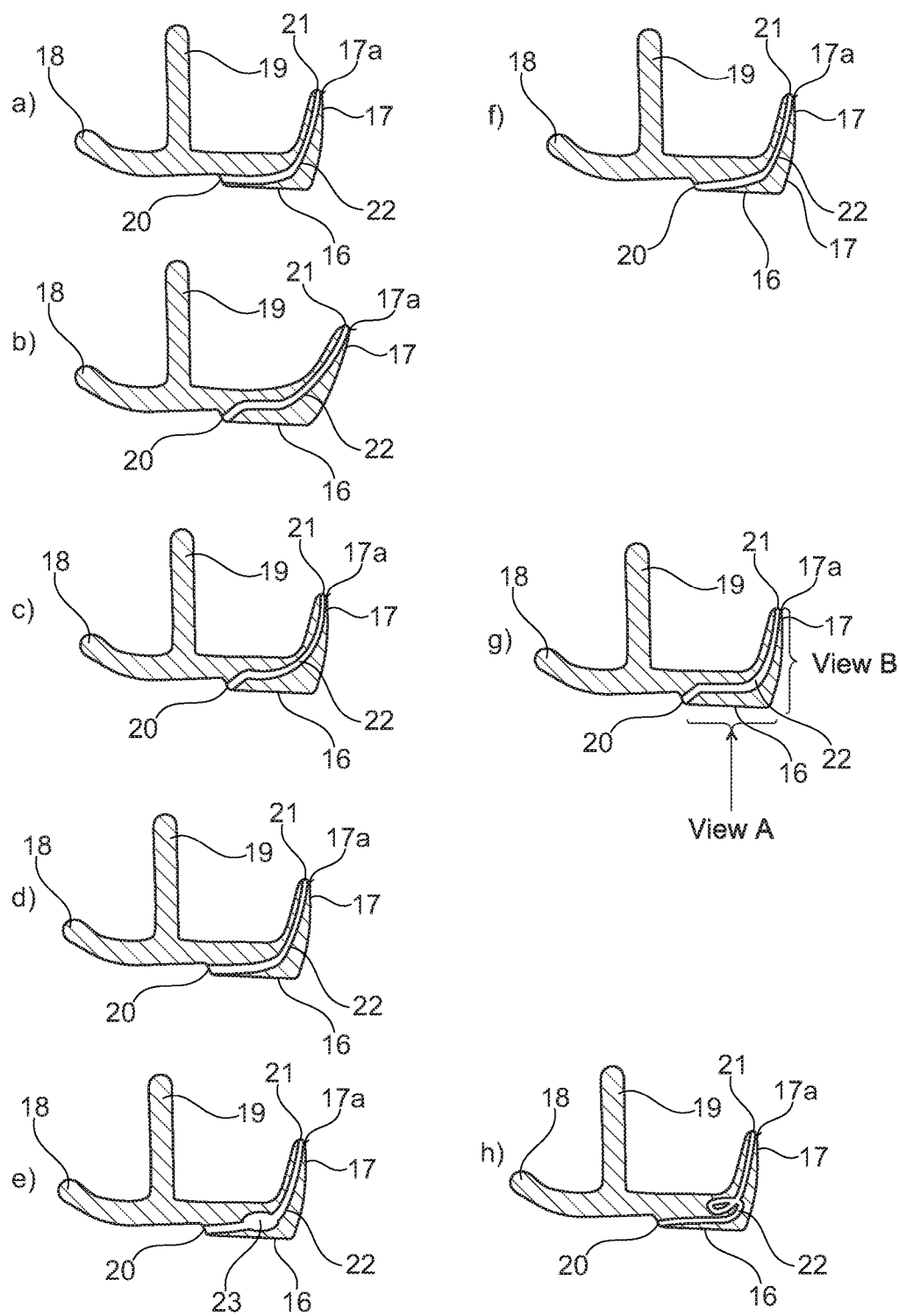
Figure 12:
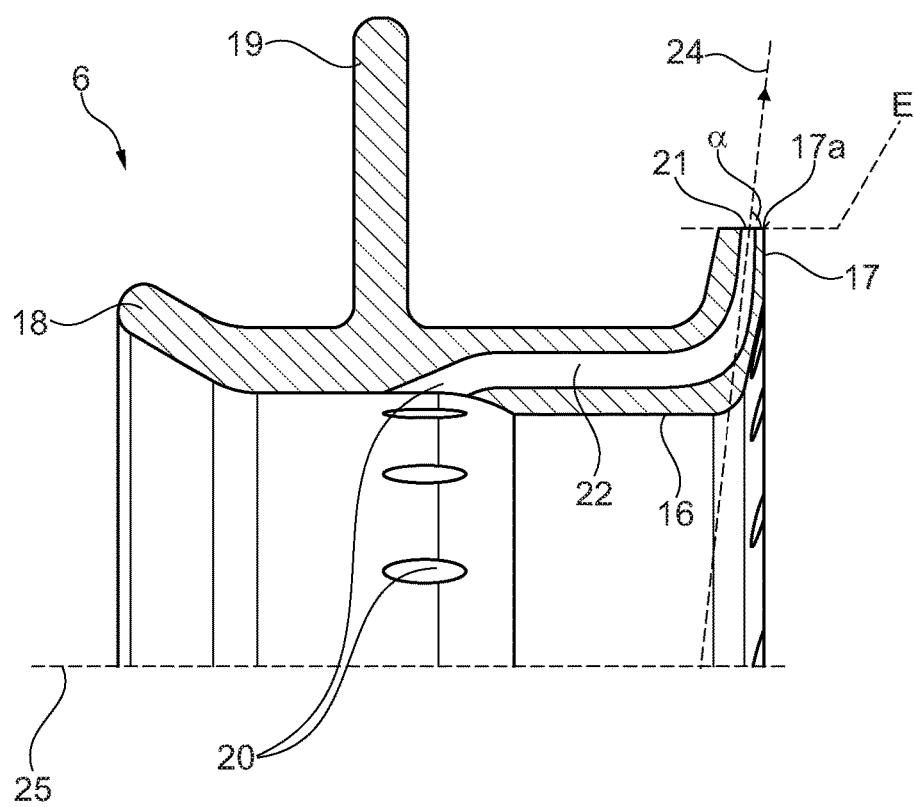

In the following, the invention is explained based on exemplary embodiments in connection with the drawing. Herein:

FIG. 1 shows a gas turbine engine for using the gas turbine combustion chamber according to the invention, FIG. 2 shows a simplified axial section view of a gas turbine combustion chamber according to the state of the art, FIG. 3 shows an enlarged detailed view of the burner seal shown in FIG. 2, FIG. 4 shows sectional views of different exemplary embodiments of the burner seal and the cooling channels in a rendering, which is analogous to FIG. 3, FIG. 5 shows different embodiment variants in view A according to FIG. 4, FIG. 6 shows different embodiment variants in view A or B according to FIG. 4, FIG. 7 shows a partial sectional view of an exemplary embodiment according to the invention, which is analogous to FIG. 4, FIGS. 8 and 9 show perspective views of different exemplary embodiments of the burner seal, FIG. 10 shows a sectional view of a burner seal according to a particularly preferred exemplary embodiment of the invention, FIG. 11a-11h show different exemplary embodiments of the burner seal with alternative embodiments of the cooling channel according to the particularly preferred exemplary embodiment of FIG. 10 and FIG. 12 shows a partial sectional view of a burner seal according to a further preferred exemplary embodiment of the invention.

The gas turbine engine 110 according to FIG. 1 represents a general example of a turbomachine in which the invention may be used. The engine 110 is configured in a conventional manner and comprises, arranged successively in flow direction, an air inlet 111, a fan 112 that rotates inside a housing, a medium-pressure compressor 113, a high-pressure compressor 114, a combustion chamber 115, a high-pressure turbine 116, a medium-pressure turbine 117, and a low-pressure turbine 118 as well as an exhaust nozzle 119, which are all arranged around a central engine axis 101.

The medium-pressure compressor 113 and the high-pressure compressor 114 respectively comprise multiple stages, of which each has an arrangement of fixedly arranged stationary guide vanes 120 that extends in the circumferential direction, with the stationary guide vanes 120 being generally referred to as stator vanes and projecting radially inward from the core engine shroud 121 through the compressors 113, 114 into a ring-shaped flow channel. Further, the compressors have an arrangement of compressor rotor blades 122 that project radially outward from a rotatable drum or disc 125, and are coupled to hubs 126 of the high-pressure turbine 116 or the medium-pressure turbine 117.

The turbine sections 116, 117, 118 have similar stages, comprising an arrangement of stationary guide vanes 123 projecting radially inward from the housing 121 through the turbines 116, 117, 118 into the ring-shaped flow channel, and a subsequent arrangement of turbine blades/vanes 124 projecting outwards from the rotatable hub 126. During operation, the compressor drum or compressor disc 125 and the blades 122 arranged thereon as well as the turbine rotor hub 126 and the turbine rotor blades/vanes 124 arranged thereon rotate around the engine central axis 101.

FIG. 4 shows different exemplary embodiments of the burner seal 6 according to the invention in a rendering analogous to FIG. 3. Here, it can in particular be seen that, adjacent to the area of larger inner diameters through which the cooling air flows in (see FIG. 3), an entry hole 20 of a cooling channel 22 is arranged in the axial direction in front of the sealing surface 16. The air flows out of the cooling channel 22 through an exit hole 21.

The different embodiment variants of FIG. 4 show that the exit hole 21 is respectively positioned at the side of the funnel 17 that is facing towards the combustion space. In this manner, the cooling air exits at the hot side of the funnel 17 and can be applied to the surface of the funnel as a cooling air film.

The exemplary embodiments of FIG. 4 show that the cooling channel 22 can be dimensioned in different manners and be formed differently with respect to its geometry. According to FIG. 4a, the cooling channel 22 is curved in an arc-shaped manner, FIG. 4b shows an s-shaped curvature similar to the embodiment according to FIG. 4c. According to FIG. 4d, the exit hole 21 is provided with an enlarged cross section. FIG. 4e shows a cross section of the cooling channel 22 that has a cavity 23 in its central area. According to FIG. 4f, the exit hole 21 is positioned at a radially exterior area of the funnel 17. FIG. 4g shows a stepped cross sectional shape of the cooling channel 22 that is comprised of linear components, while FIG. 4h shows an exemplary embodiment in which the cooling channel 22 is embodied in a coil-like manner to optimize the cooling of the burner seal 6 or of the funnel 17.

FIG. 4g shows views A and B, which FIGS. 5 and 6 are based on. FIG. 5a shows respectively round entry holes 20 to which courses of cooling channels 22 connect which are linear (FIG. 5a), obliquely positioned (FIG. 5b), arc-shaped (FIG. 5c), coiled (FIG. 5d), widened in the manner of diffusor (FIG. 5e) or provided with a cavity 23 (FIG. 5f).

In view A or view B, FIG. 6 shows possible embodiments of the entry hole 20 and the exit hole 21. They can be designed to be circular (FIG. 6a), oval (FIGS. 6b and 6c) or diamond-shaped (FIG. 6d).

By way of clarification, FIG. 7 shows a perspective partial sectional view of the burner seal according to the invention, from which in particular the arrangement of the entry hole 20, of the exit hole 21 as well as of the cooling channel 22 may be gathered.

FIGS. 8 and 9 respectively show perspective renderings of different embodiment variants, which differ in particular with respect to the embodiment and dimensioning of the entry hole 20 and of the exit hole 21.

FIGS. 10 to 12 show different variants of a particularly preferred embodiment of the present invention.

As shown in FIG. 10, the burner seal 6 seals with the sealing surface 16 at the fuel nozzle 5. The sealing surface 16 is formed with a smaller inner diameter than the area of the inflow side with the ring-shaped inlet lip 18 that is positioned in front of it in the flow direction.

Here, the entry holes 20 are provided in a manner distributed about the circumference at the transitional area between the inflow side and the sealing surface 16. Starting from the entry hole 20, the cooling channel 22 extends in the funnel 17 up to an outermost end area 17a of the funnel 17, and exits from the outermost end area 17a from an exit hole 21.

As can in particular be seen from FIG. 10, the outermost end area 17a of the funnel 17 is formed to be arc-shaped, in particular semi-circular, in its section. Here, the exit hole 21 is positioned in this arc-shaped, outermost end area 17a. As can be seen from FIG. 10, a central axis 24, which leads through a center point of the exit hole 21, is arranged at an angle α to the main axis 25 of the burner seal 6. In the exemplary embodiment shown in FIG. 10, the angle α is 75°. In this manner, a particularly good air conduction of the cooling air through the funnel 17 as well as at the exit of the funnel can be achieved.

In particular the entire funnel 17 can be cooled at its side that is facing towards the combustion chamber, as well as at its side that is facing away from the combustion chamber. At that, the cooling channel 22 is guided through the funnel 17 in such a manner that a wall thickness towards the side that is facing towards the combustion chamber as well as the side that is facing away from the combustion chamber is identical. In this manner, a particular stability of the funnel is facilitated. A diameter of the cooling channel 22 tapers off in the flow direction. Thus, the cooling channel is formed as a nozzle.

In this way, the cooling channel can cool the sealing area 16 at which the burner seal 6 has contact with the fuel nozzle, as well as effectively cool the funnel 17 up to the end area 17a of the funnel.

FIGS. 11a to 11h show different variants for the shapes of the funnel. Here, it is shown that the cooling channel 22 can have most varied dimensions and geometries.

In FIG. 11a, the cooling channel is curved in an arc-shaped manner, wherein, starting from the entry hole 20, at first there is a linear area substantially parallel to the sealing surface 16, and after the curve a substantially linear area is provided again up to the outermost end area 17a of the funnel. The exit hole 21 is provided at the outermost tip of the funnel 17.

FIG. 11b shows an s-shaped curvature of the cooling channel 22, wherein the funnel 17 projects a little further into the combustion space.

FIG. 11c shows an embodiment that is similar to FIG. 11b, wherein the exit hole 21 is aligned at an angle of almost 90° with respect to the central axis 25 of the burner seal.

FIG. 11d shows an embodiment in which a cross section of the cooling channel 22 continuously tapers off starting from the entry hole 20 up to the exit hole 21.

FIG. 11e shows a cooling channel 22 that has a cavity 23 in a central area. In this manner, an improved cooling at the sealing surface 16 can be achieved.

FIG. 11f shows a cooling channel 22 in which a diameter of the entry hole 20 is smaller than a diameter of the exit hole 21. Thus, the cooling channel of FIG. 11f has a diffusor effect.

FIG. 11g shows a stepped cross-sectional shape of the cooling channel 22 that is comprised of linear components.

FIG. 11h shows a preferred embodiment, in which the cooling channel 22 is formed in a coil-like manner to optimize the cooling of the burner seal 6 of the funnel 17, in particular at the end of the burner seal 6 that is facing towards the combustion space.

FIG. 11g shows once more the views A and B in a schematic manner, wherein the geometric shape of entry holes 20 and the exit holes 21 is designed according to the examples shown in FIGS. 5 and 6. Here, any desired combination of different geometric shapes of entry holes 20 or exit holes 21 is possible.

FIG. 12 shows a further particularly preferred embodiment of the invention, which substantially corresponds to the embodiment shown in FIG. 10. In contrast to that, the outermost end area 17a is embodied in a linear manner in the preferred embodiment shown in FIG. 12. At that, the outermost end area 17a forms a surface E, which is parallel to the central axis 25 of the burner seal 6. The angle α is exactly 90° in this exemplary embodiment.

Thus, the shown burner seal 6 of a gas turbine clearly provides an improvement of a cooling of the burner seal, which results in low wear and in particular also in low maintenance costs, since the burner seal 6 does not have to be replaced as often as in the state of the art. In addition, the solution according to the invention of providing the exit hole 21 at the end area 17a of the funnel 17 provides the possibility to cool the entire funnel. It can also be avoided that excessively hot areas occur at the funnel 17 at the side of the funnel that is facing towards the combustion chamber as well as at the side of the funnel that is facing away from the combustion chamber.

Alternatively, the present invention can also be described by the following phrases:

1. Burner seal of a gas turbine with a substantially tubular base body, which has a ring-shaped inlet lip on the inflow side (18) and a funnel (17) at its outflow side, wherein an inner diameter of the inflow side is embodied to be larger than an inner diameter of a sealing surface that is arranged axially in front of the funnel (16), wherein cooling channels (22) are formed in the base body in a manner distributed about the circumference, characterized in that the cooling channels (22) are respectively formed in the base body in the area of the sealing surface (16) and of the funnel (17), and respectively open into an exit hole (21) in an axially outwardly oriented area of the funnel (17).
2. Burner seal according to phrase 1, characterized in that the cooling channels (22) respectively have one entry hole (20) that is arranged in an area of the larger inner diameter of the base body.
3. Burner seal according to phrase 1 or 2, characterized in that the cooling channels (22) respectively have one entry hole (20) which is arranged in the sealing area (16).
4. Burner seal according to any of the phrases 1 to 3, characterized in that the exit hole (21) is formed on the external side of the funnel (17) for forming a cooling air film.
5. Burner seal according to any of the phrases 1 to 4, characterized in that the exit hole (21) is formed in the radially outwardly oriented direction out of the funnel (17) for forming a cooling air flow.
6. Burner seal according to any of the phrases 1 to 5, characterized in that the cooling channel (22) is provided with a circular, elliptic, diamond-shaped and/or drop-shaped cross section.
7. Burner seal according to any of the phrases 1 to 6, characterized in that the cross section of the cooling channel (22) is formed to be variable across its length.
8. Burner seal according to any of the phrases 1 to 7, characterized in that the cooling channel (22) is formed to be curved, bent and/or linear across its length.
9. Burner seal according to any of the phrases 1 to 8, characterized in that the surfaces of the entry hole (20) and of the exit hole (21) respectively have the same or different dimensions.
10. Method for manufacturing a burner seal (6) according to any of the phrases 1 to 9, wherein the method is an additive method.

PARTS LIST 1 combustion chamber wall
2 head plate
3 heat shield
4 combustion chamber head
5 fuel nozzle
6 burner seal
7 shingle
8 admixing hole
9 cooling hole
10 bolt
11 nut
12 impingement cooling hole
13 effusion cooling hole
14 cooling hole
15 cooling air hole
16 sealing surface
17 funnel
17a outermost end area of the funnel
18 inlet lip
19 annular web
20 entry hole
21 exit hole
22 cooling channel
23 cavity
24 central axis
25 central axis of the burner seal
α angle between central axis 24 of the exit hole and central axis 25 of the burner seal
E surface of the outermost end area 17a
101 engine central axis 110 gas turbine engine/core engine
111 air inlet
112 fan
113 medium-pressure compressor (compactor)
114 high-pressure compressor
115 combustion chamber
116 high-pressure turbine
117 medium-pressure turbine
118 low-pressure turbine
119 exhaust nozzle
120 guide vanes
121 core engine housing
122 compressor rotor blades
123 guide vanes
124 turbine blades
125 compressor drum or compressor disc
126 turbine rotor hub
127 outlet cone

The invention claimed is:

1. A burner seal of a gas turbine comprising:
   a tubular base body including an inflow side and an outflow side;
   a ring-shaped inlet lip on the inflow side;
   a funnel on the outflow side;
   a sealing surface arranged axially upstream of the funnel, wherein an inner diameter of the inflow side is larger than an inner diameter of the sealing surface;
   an entry hole located in an inner surface of the burner seal;
   an exit hole positioned in the funnel; and
   a cooling channel formed in the base body and extending from the entry hole to the exit hole.

2. The burner seal according to claim 1, wherein the exit hole opens into an outermost end area of the funnel.

3. The burner seal according to claim 1, wherein a central axis of the exit hole is positioned at an angle of 70° to 90° with respect to a central axis of the burner seal.

4. The burner seal according to claim 1, wherein the entry hole is arranged in an area of the inner diameter of the inflow side.

5. The burner seal according to claim 1, wherein the entry hole is arranged in an area of the sealing surface.

6. The burner seal according to claim 1, wherein the cooling channel has at least one chosen from a circular, elliptic, diamond-shaped and drop-shaped cross section.

7. The burner seal according to claim 1, wherein a cross section of the cooling channel is variable along a length of the cooling channel.

8. The burner seal according to claim 1, wherein the cooling channel is at least one chosen from curved, bent and linear along a length of the cooling channel.

9. The burner seal according to claim 1, wherein a surface of the entry hole and a surface of the exit hole have same dimensions.

10. The burner seal according to claim 1, wherein a central axis of the exit hole is positioned at an angle of 70° to 80° with respect to a central axis of the burner seal.

11. The burner seal according to claim 10, wherein a central axis of the exit hole is positioned at an angle of 75° with respect to a central axis of the burner seal.

12. The burner seal according to claim 1, wherein a surface of the entry hole and a surface of the exit hole have different dimensions.

13. A method for manufacturing a burner seal, comprising:
   providing:
      a tubular base body including an inflow side and an outflow side;
      a ring-shaped inlet lip on the inflow side;
      a funnel on the outflow side;
      a sealing surface arranged axially upstream of the funnel, wherein an inner diameter of the inflow side is larger than an inner diameter of the sealing surface;
      an entry hole located in an inner surface of the burner seal;
      an exit hole positioned in the funnel; and
      a cooling channel formed in the base body and extending from the entry hole to the exit hole;
   manufacturing the burner seal using an additive process.

* * * * *